Figure 1:
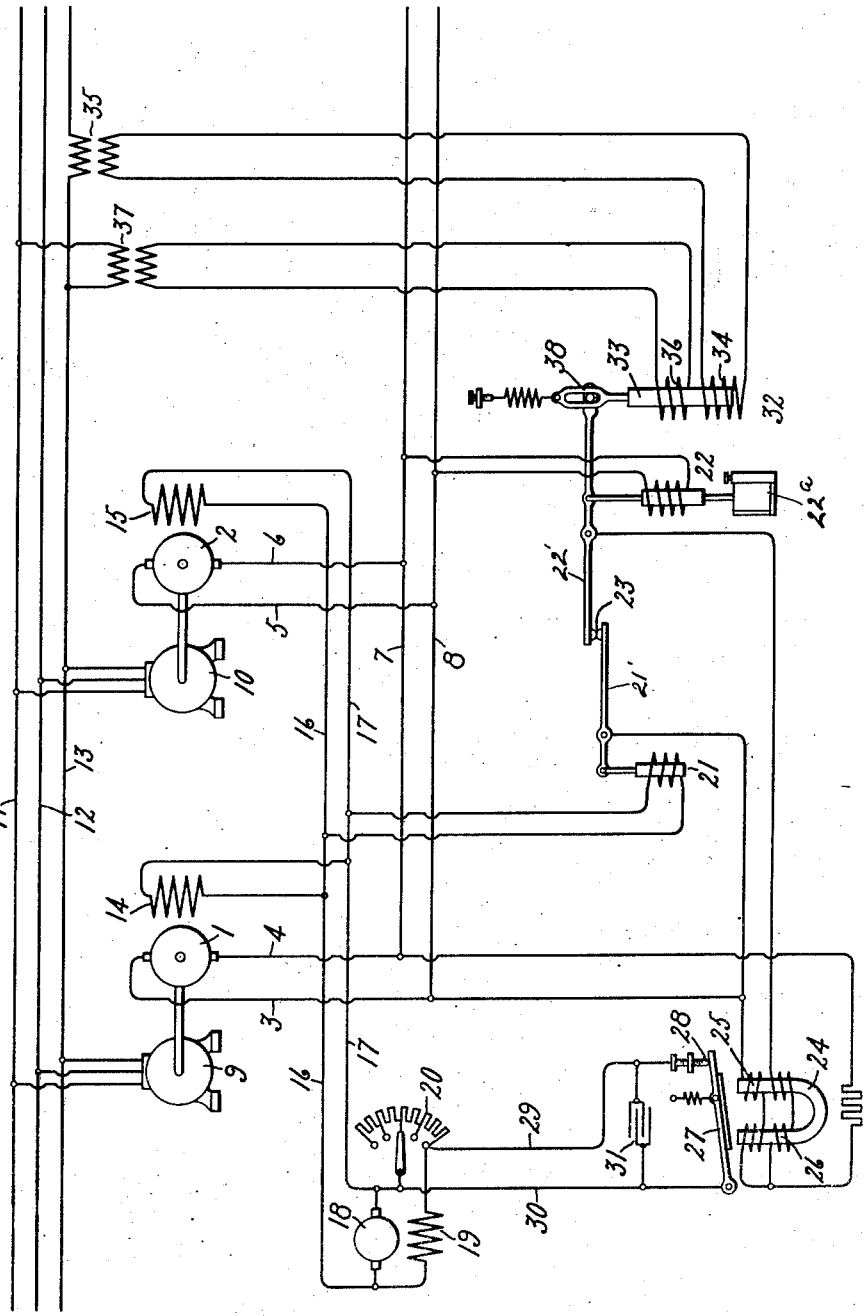

C. W. STONE.
VOLTAGE REGULATOR.
APPLICATION FILED DEC. 7, 1909.

1,091,716.

Patented Mar. 31, 1914.
2 SHEETS—SHEET 1.

Witnesses:
George W. Tilden
J. Ellis Glen

Inventor:
Charles W Stone,
by Albert G. Davis
Att'y

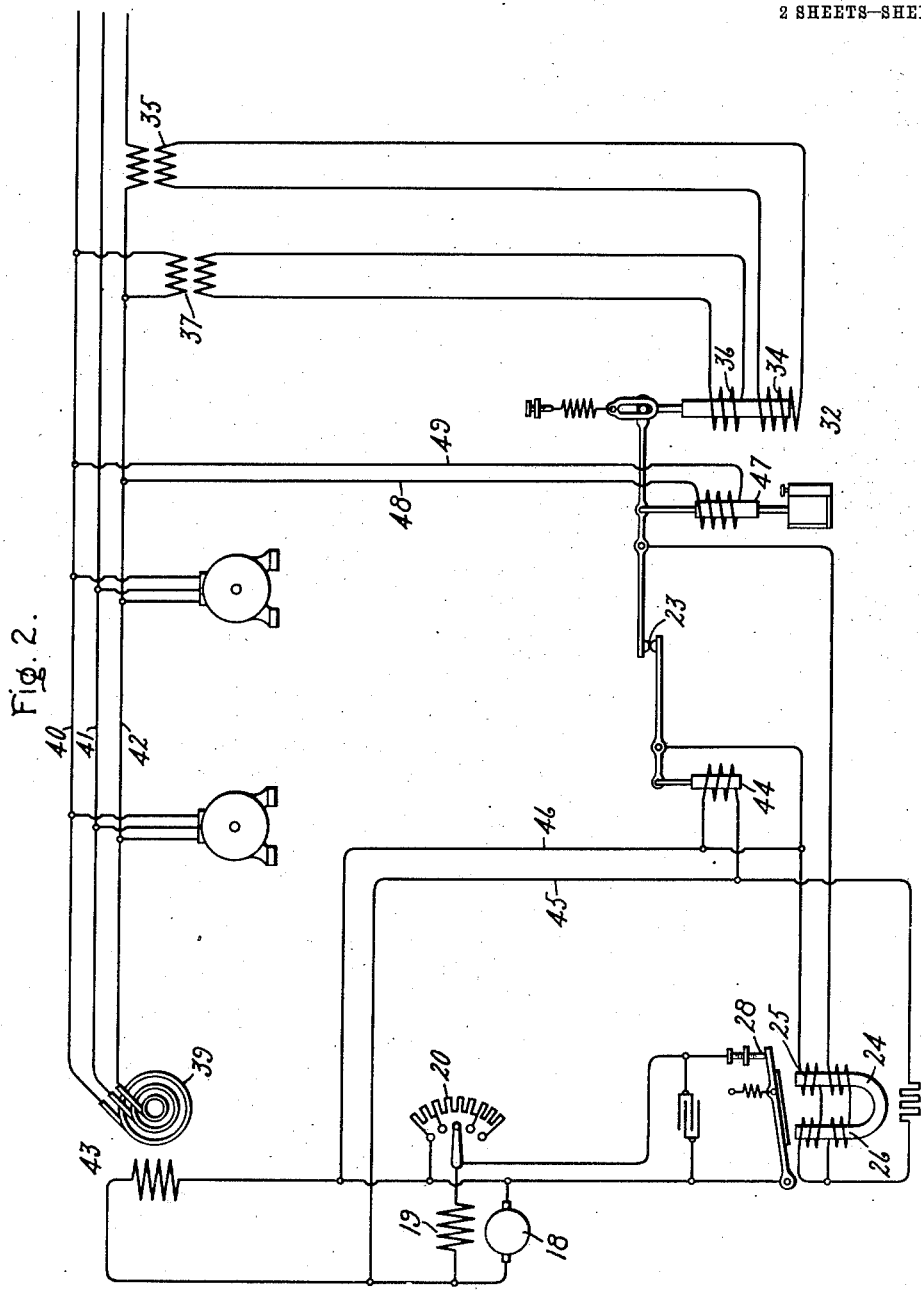

UNITED STATES PATENT OFFICE.

CHARLES W. STONE, OF SCHENECTADY, NEW YORK, ASSIGNOR TO GENERAL ELECTRIC COMPANY, A CORPORATION OF NEW YORK.

VOLTAGE-REGULATOR.

1,091,716.  Specification of Letters Patent.  Patented Mar. 31, 1914.

Application filed December 7, 1909. Serial No. 531,793.

*To all whom it may concern:*

Be it known that I, CHARLES W. STONE, a citizen of the United States, residing at Schenectady, in the county of Schenectady and State of New York, have invented certain new and useful Improvements in Voltage-Regulators, of which the following is a specification.

My invention has reference to improvements in the regulation and control of the output of dynamo-electric machines in such manner as to limit that output to a predetermined quantity, whereby overloading of the machine is prevented. In accordance with my invention, this result can be accomplished either by controlling the field excitation of the generator directly by and in accordance with the load placed upon it, or by regulating the amount of current which can be tapped from the line. In the first case a limitation is put upon the output of the generator, while in the second case the consumption of current from the line is limited.

My invention also contemplates the limitation of the voltage of the generator to a predetermined value.

Voltage regulators of the Tirrill type maintain a constant voltage on the generator under conditions of varying load by rapidly opening and closing a shunt circuit around a resistance in the field circuit of the generator, or its exciter; the relative length of the intervals of time during which the resistance is included in the field circuit being varied in accordance with the variations of the voltage. When the voltage tends to increase, the intervals during which the resistance is included in a field circuit are somewhat lengthened, thus decreasing the excitation, and conversely, when the voltage tends to fall below normal, the intervals during which the resistance is short-circuited are relatively shortened.

Now, in accordance with my invention the Tirrill regulator operates normally in the manner above indicated, but upon the occurrence of a load or voltage beyond the predetermined maximum the special device provided for this purpose is made to operate by the increase of load or voltage to increase the intervals during which the resistance is included in the field circuit either of the generators supplying the main line or of some generators driven by current derived from the line. This auxiliary device is a magnet linked with the regulator in such a manner that when the load or voltage is less than a predetermined value the regulator is unaffected; but when the load or voltage tends to exceed the predetermined value the auxiliary magnet operates conjointly with the regulator to limit the field excitation of the generator.

My invention will be more clearly understood by reference to the accompanying drawings, of which—

Figure 1 illustrates my invention as applied to a plurality of converting devices, such as motor generator sets, the generators operating in parallel and the motors being fed from a common supply line; Fig. 2 shows a single generator with a regulator equipped with the auxiliary device operating upon the exciter for the generator.

Referring to Fig. 1, the direct-current generators 1, 2 are connected in parallel by means of conductors 3, 4 and 5, 6, to the direct-current mains 7, 8. The generators 1, 2 are directly connected to alternating-current motors 9, 10, which may be of any suitable type. The motors take current from a three-phase main supply circuit 11, 12, 13, fed from a source of current not shown in the drawing. In the place of motor-generator sets, rotary converters can be used in a similar manner. It will be understood that my invention is not limited to a system of any particular number of phases.

The fields 14, 15 of the generators 1, 2 respectively, are connected in parallel to the exciter mains 16, 17, as clearly shown. Of course, when these generators are of the direct current type, the exciter will not always be necessary. The exciter 18 is provided with a shunt field 19, which has included in its circuit an adjustable resistance 20. When the generators 1, 2 are self-excited the resistance 20 is included directly in series with the field circuit of each generator. The regulating mechanism of the system, as here shown, is of the well-known Tirrill type, containing a magnet 21 connected across the exciter mains, and a magnet 22 operating conjointly therewith and connected across the generator mains. The core of magnet 22 is connected to a pivoted arm 22' and its movements are retarded by means of the dashpot 22ª. The arm 22',
therefore, moves slowly in response to the voltage of the generators 1, 2, and is commonly known as the "floating contact arm." The core of magnet 21 is connected to a pivoted arm 21' which vibrates constantly in response to the variations of exciter voltage. The movements of these arms rapidly open and close a contact 23. The opening and closure of this contact controls a relay magnet 24, which is differentially wound, having one winding 25 directly connected across the generator mains 7, 8, and differential winding 26 connected across said mains in series with the contacts 23. The armature 27 of the relay magnet operates to open and close a relay contact 28, which is included in a shunt circuit around the exciter resistance 20, and consisting of conductors 29, 30. Sparking at the relay contacts 28 is suppressed in the usual manner by condenser 31. The auxiliary regulator control mechanism consists of a magnet 32 having a spring-supported armature 33, a current winding 34 connected to a current transformer 35 included in the main supply lines, and a voltage winding 36 included in the secondary of a voltage transformer 37 connected across two of the phase legs of the main supply line, the windings 34 and 36 aiding each other. The core of the auxiliary magnet 32 is loosely connected to the floating contact arm 22' by means of a lost-motion device, comprising a pin passing through a slotted rod 38.

Fig. 2 shows a main alternating-current generator 39 feeding a three-phase line 40, 41, 42. It is provided with a separately-excited field 43 energized by an exciter 18, which has a shunt field 19 connected in series with an adjustable resistance 20 in a manner similar to that shown in connection with Fig. 1.

A direct-current magnet 44 is connected across the exciter mains by means of conductors 45, 46, and a coacting alternating-current magnet 47 is connected across two of the conductors of the main supply circuit by means of conductors 48, 49. The operation of the magnets 44, 47 opens and closes the main contacts 23, as described in connection with Fig. 1. The differential relay magnet 24 has one winding 25 directly connected across the exciter mains, and the differential winding 26 connected across said mains in series with the main contacts 23, as clearly shown. The auxiliary magnet 32 is the same as that described in connection with Fig. 1; but in this case it has its current winding 34 connected to the secondary of the current transformer 35, which is included in the circuit of the generator whose voltage and output are to be regulated. The voltage winding 36 is connected in series with the secondary of the transformer 37, connected across the mains of the generator 39.

The operation of the systems described proceeds as follows: In the example illustrated by Fig. 1, when the load and voltage on the main supply lines 11, 12, 13, are less than the predetermined maximum limit, the regulator operates to maintain a constant potential on the generators 1, 2 that are driven by current derived from said lines, by opening the contacts 23 whenever the voltage tends to exceed the normal voltage, causing in turn the relay contacts 28 to open, thereby including the resistance 20 in the field circuit of the exciter 18. This lowers the voltage of the exciter, decreases the excitation of the generators 1, 2, and immediately lowers their voltage, causing the contacts 23 and 28 to close again. When the generators are self-excited this same action takes place directly on the field of the generator, as is well understood. Because of the sensitiveness of the regulator the contacts vibrate continuously at a high rate of speed, the effect being that when the voltage in the mains 7, 8 tends to rise above normal the intervals of time during which the contacts are open lengthen somewhat, restoring the normal voltage, as explained, and when the voltage tends to fall below normal, the relative duration of the intervals of time during which the contacts are closed lengthen somewhat, thus raising the voltage to the normal value. In this manner the generator voltage never appreciably varies from the normal value. If now, the load on the main supply line 11, 12, 13 tends to increase either by an increase of load on the generators 1, 2, or by an increase of load elsewhere on its system, the magnet 32 begins to act; the armature 33 is drawn down, but does not interfere with the action of the regulator until a predetermined limit of load is reached. If, however, the load tends to exceed the predetermined limit, the rod extension 38 of core 33 engages with the floating contact arm 22' and raising the contact end thereof prolongs the interval during which contacts 23 are opened. This lowers the voltage of the exciter by increasing the time during which resistance 20 is included in its field circuit, and thereby decreases the field excitation of the generators 1, 2, lowering their voltage and in turn the load current generated by the same. A decrease in load current of the generators 1, 2, of course, will also decrease the power consumed by the motors 9, 10 running the generators, and in this manner decrease the total load on the system.

Should there be an abnormal increase of voltage on the main supply line, for any reason, the voltage winding 36 will begin to draw down the armature 33. When the predetermined limit is reached the contact on the floating contact arm 22' will be raised and the excitation on the generators 1, 2 decreased, thereby decreasing the load on the system.

The operation of the system shown in Fig. 2 is similar to that shown in Fig. 1, except that the auxiliary magnet 32 operates to decrease the excitation of the generator whose load or voltage is tending to increase beyond a predetermined limit instead of decreasing the amount of power consumed by translating devices connected to its lines. As shown in this figure, the regulator tends to maintain constant voltage on the lines 40, 41, 42 by varying the voltage of the exciter supplying the field 43, until the load or voltage on these lines tends to increase beyond a predetermined limit, when the core of the magnet 32 engages with the lever of the alternating-current magnet 47, prolonging the interval during which contacts 23 are opened, which in turn prolongs the time the relay contacts 28 are open, in this manner cutting down the exciter voltage, and hence the excitation of the generator 39, whereby the possible load current and voltage which it is able to furnish are decreased.

It is obvious that when the voltage is maintained approximately constant the voltage winding of the magnet 32 has very little effect on its operation, since its power remains nearly constant, unless the power factor of the system varies considerably. The voltage winding may, therefore, in some cases be omitted without altering the operation of the system, as just described.

What I claim as new and desire to secure by Letters Patent of the United States, is:

1. In combination, an electrical distributing system, a translating device taking electrical energy from said system and transferring the same to another system, an automatic regulator for the second mentioned system and a separate means responsive to the load on the first mentioned system for operating the regulator of the second system and limiting the draft of energy from the first system when the load on said first system tends to exceed a predetermined value.

2. In combination, an electric distribution system, motors taking energy therefrom, electrical generators driven thereby, an automatic regulator for controlling the field excitation of said generators, and means responsive to the load on the distribution system for limiting the increase of excitation when the load on said distribution system tends to exceed a predetermined limit.

3. In a system of distribution, a generator, means to drive the generator, automatic means to regulate the generator, and an additional means responsive to both the current supplied and the voltage at which said current is supplied to said driving means, controlling the regulating means.

4. In a system of distribution, a generator, means to drive the generator, an automatic regulator for said generator, said regulator including a movable arm, means for moving said arm, and an electromagnet controlling said arm, said electromagnet being connected so that it is energized in proportion to both the current supplied and the voltage at which said current is supplied to the driving means.

5. In combination a system of distribution, a regulator therefor including a movable arm, an electromagnet normally controlling the arm energized in proportion to the voltage of a part of the system, another electromagnet provided with an armature having a slot and pin connection with the arm energized in proportion to the current in a part of the system.

6. In combination, an electric distribution system, a motor operated by energy therefrom, a generator driven by the motor, an automatic regulator for the generator and means associated with the regulator and responsive to the load on said distribution system for limiting the amount of excitation when the load on said distribution system tends to exceed a predetermined limit.

7. In combination a system of distribution, an automatic voltage regulator having a floating contact arm, a magnet responsive to the voltage on a part of said system having its core connected to said arm, a second magnet, responsive to the load on a part of said system, having its core loosely connected to said arm to aid the first magnet to prevent an increase of voltage when the load exceeds a predetermined limit.

8. In combination a system of distribution, an automatic voltage regulator having a floating contact arm, a magnet responsive to the voltage on a part of said system, having its core connected to said arm, a second magnet, provided with two windings, one responsive to the load and the other responsive to the voltage on a part of said system, having its core loosely connected to said arm to aid the first magnet to prevent an increase of voltage when the load or voltage on a part of said system exceeds a predetermined limit.

In witness whereof, I have hereunto set my hand this 6th day of December 1909.

CHARLES W. STONE.

Witnesses:
BENJAMIN B. HULL,
HELEN ORFORD.